D. TEHUR.
MILKING MACHINE.
APPLICATION FILED SEPT. 5, 1919.
1,354,145.
Patented Sept. 28, 1920.
3 SHEETS—SHEET 1.
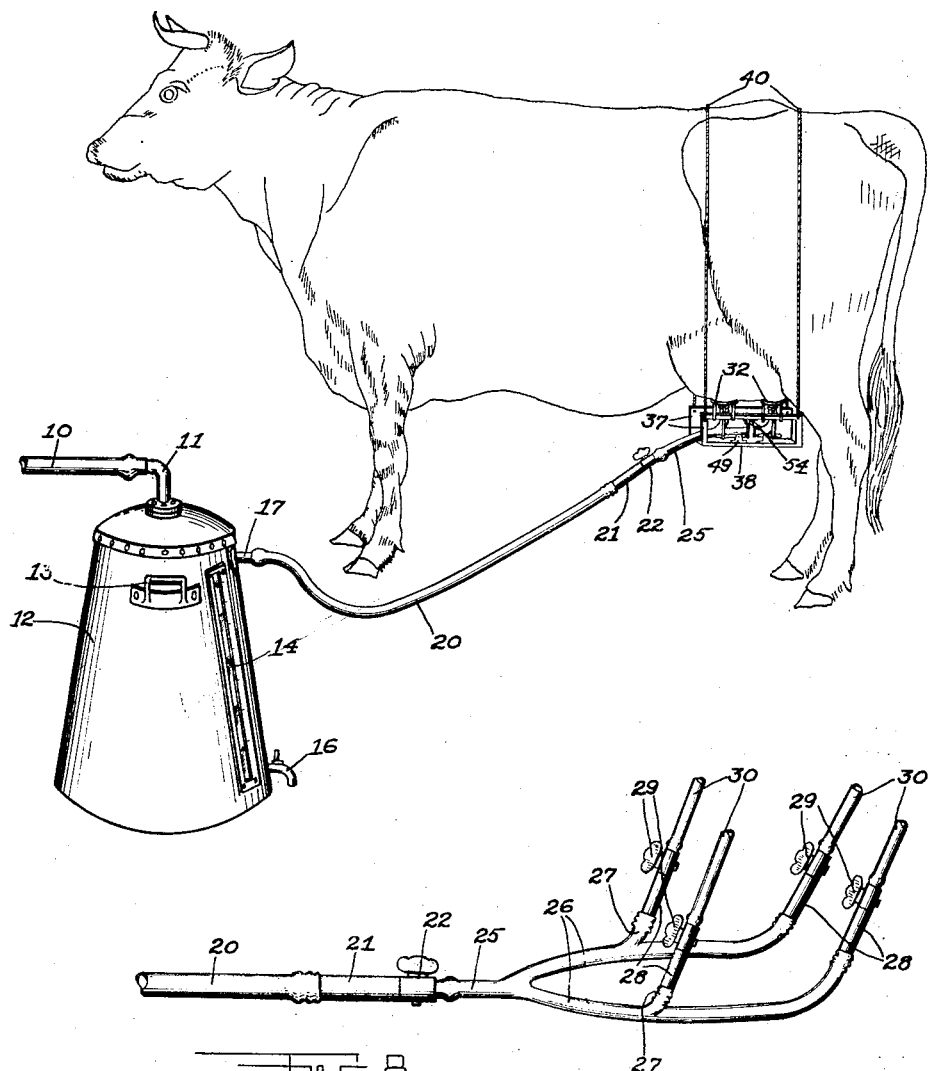
INVENTOR.
Dyon Tehur
BY
ATTORNEY.

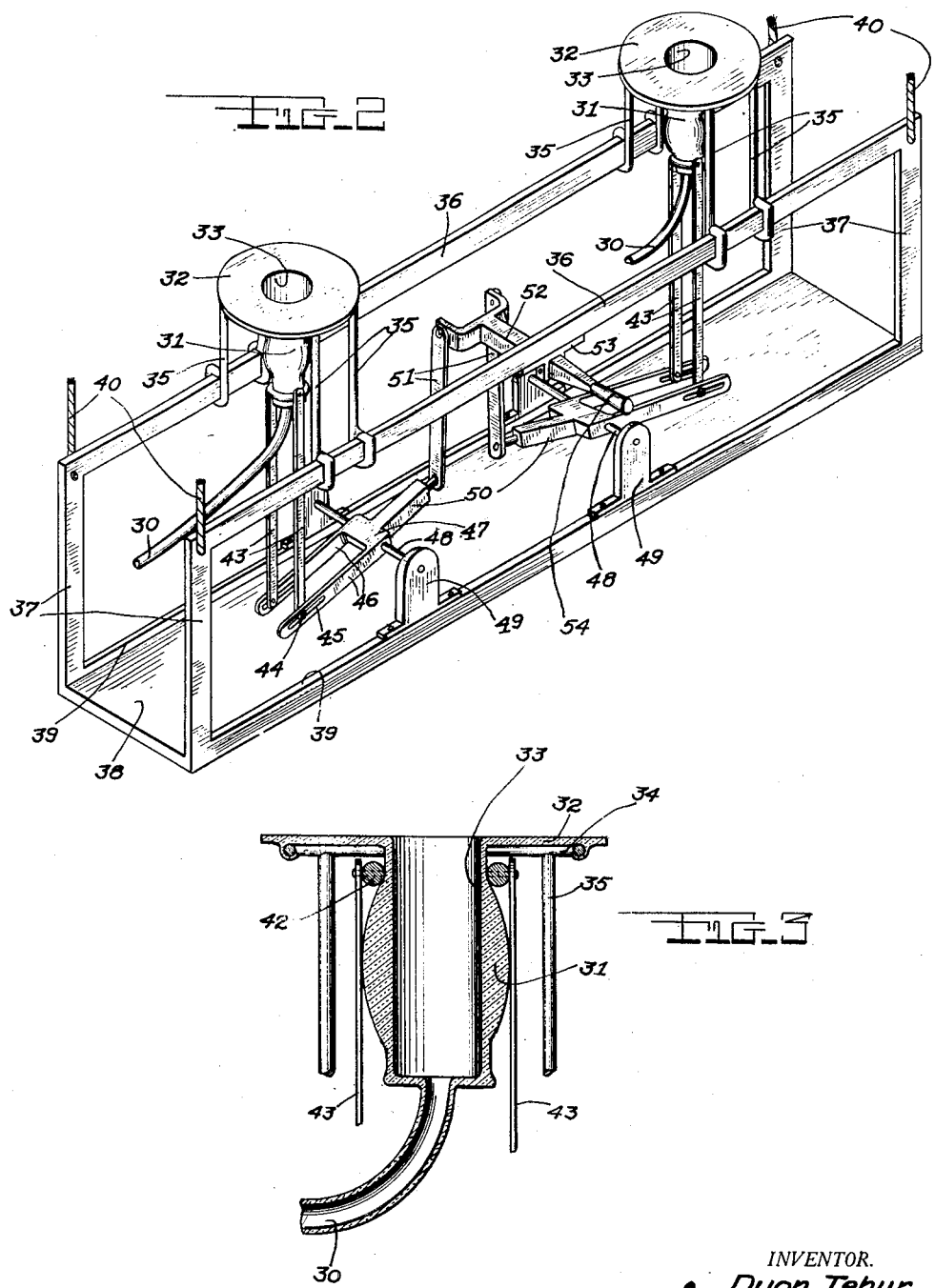

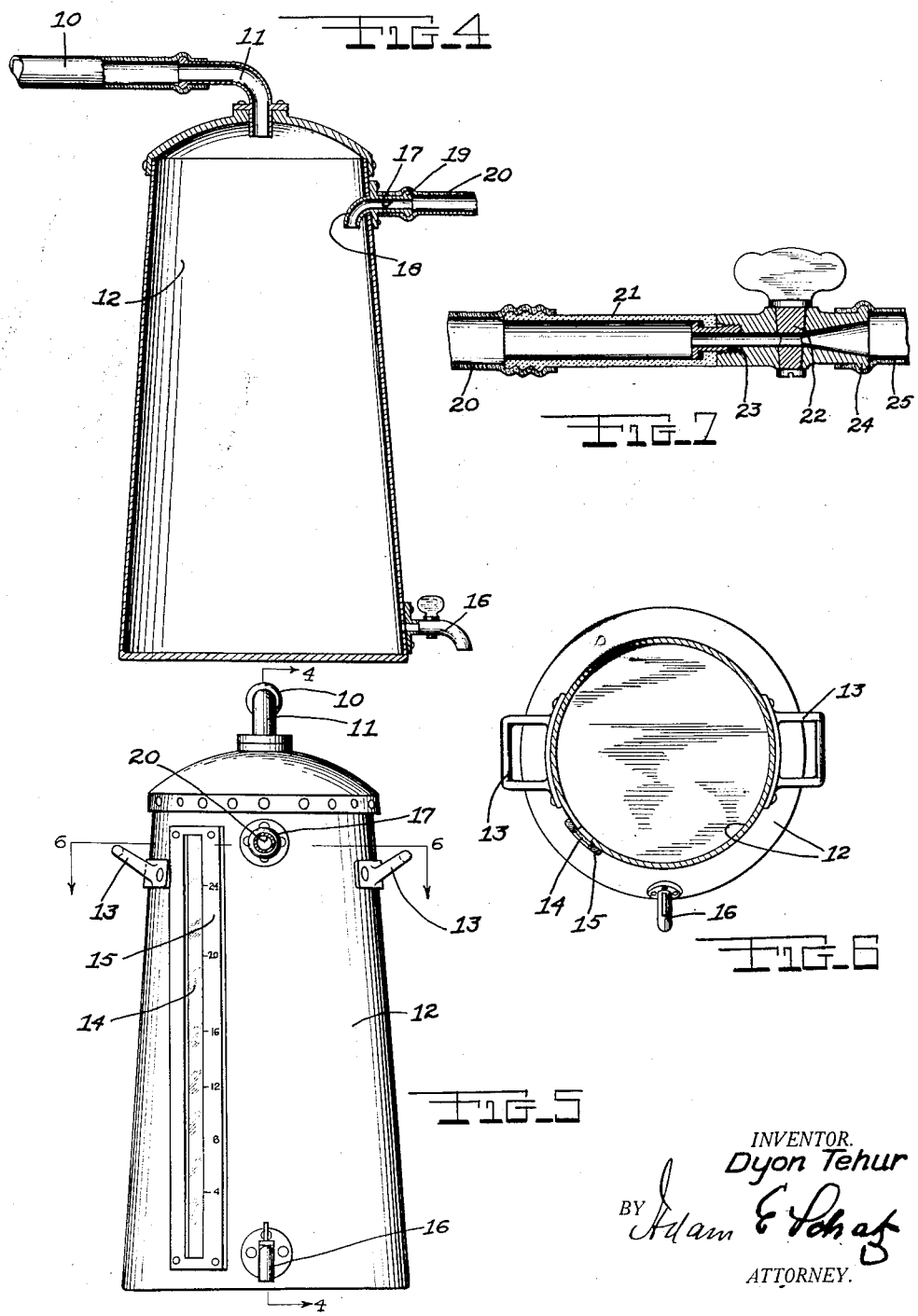

UNITED STATES PATENT OFFICE.

DYON TEHUR, OF CALGARY, ALBERTA, CANADA.

MILKING-MACHINE.

1,354,145.　　　　Specification of Letters Patent.　　Patented Sept. 28, 1920.

Application filed September 5, 1919. Serial No. 321,850.

*To all whom it may concern:*

Be it known that I, DYON TEHUR, a citizen of Ruthania, residing at Calgary, Province of Alberta and Dominion of Canada, have invented certain new and useful Improvements in Milking-Machines, of which the following is a specification.

This invention has as its object the provision of an apparatus for producing pulsations combined with a suction effect whereby milk may be extracted from the udder of a cow in a rapid and effective manner without discomfort to the animal.

Another object is to provide an apparatus capable of producing a pulsating and sucking action simultaneously, including means of control so that the suction effect may be discontinued when the milk has become exhausted.

A further object is to provide an apparatus which may be easily attached to a cow and manually operated in an effective manner with a minimum of exertion.

These and other like objects are attained by the novel construction and combination of parts hereinafter described and shown in the accompanying drawings, forming a material part of this disclosure, and in which—

Figure 1 is a perspective view showing the application of an apparatus to an animal.

Fig. 2 is an enlarged perspective view showing the mechanical elements of the apparatus.

Fig. 3 is a further enlarged fragmentary vertical sectional view taken through one of the teat cups.

Fig. 4 is a vertical sectional view taken on line 4—4 of Fig. 5, showing the vacuum vessel into which the milk is conducted.

Fig. 5 is a side elevational view thereof.

Fig. 6 is a transverse sectional view taken on line 6—6 of Fig. 5.

Fig. 7 is an enlarged fragmentary longitudinal sectional view taken through the valve connection, and Fig. 8 is a perspective view showing the flexible connections engaged with each of the teat cups.

Referring to the drawings in detail, the numeral 10 indicates a flexible tube, one end of which is adapted to be engaged with a suction pump or like apparatus, adapted to produce a partial vacuum. This tube is connected with a metallic elbow 11, entering a substantially air-tight container 12, provided with oppositely disposed handles 13 by which it may be manipulated. The container is further provided with a transparent panel 14 adjacent to a vertical scale 15, whereby the contents of the container may be readily observed.

A faucet 16 is fixed in the lower portion of the container by which the contents may be withdrawn at any desired time.

Secured upon the upper portion of the container 12 is a flanged sleeve 17, formed with an elbow extension 18, leading toward the bottom of the container, and engageable with the beaded portion 19 of the sleeve is a flexible tube 20, connected at its outer end with a rigid tube 21.

This tube engages a valve 22, controlling the passage, the valve body being connected with a nipple 23, set in the tube 21 so as to form a liquid tight joint, while the other end of the body is beaded, as at 24, and has engaged with it another flexible tube 25, having a pair of branches 26, from which extend other branches 27, the several branches 26 and 27 entering tubes 28, controlled by valves 29, to the outer ends of which are connected flexible tubes 30, formed with or secured to flexible, pliable teat cups 31, preferably made of soft rubber, or equivalent substance, oval in their contour and formed with flanges 32 at their outer ends adapted to make contact with the udder of the animal while the teats enter central cylindrical openings 33 formed therein.

Wires 34 are bent to form a circle and engaged within the lower side of the flanges 32 in the manner of a ring and extending downward therefrom are pairs of oppositely disposed support rods 35, looped at their lower ends to slidably engage rails 36, carried by posts 37, secured to a plate 38, having raised side edges 39, the foregoing elements constituting a frame supported by straps or cords 40, attached at its corners and passing over the back of the animal, as plainly shown in Fig. 1, thereby supporting the apparatus in close engagement with the udder of the animal.

Rigid rings 42 of circular cross section encircle the upper, attenuated portions of the teat cups 31, below the flanges 32 and have attached to their opposite sides, links 43 having at their lower ends pins 44 engaged in elongated slots 45, formed in the arms 46 of forked levers 47, pivoted upon spindles 48, supported by brackets 49, extending up from the raised frame edges 39, the inner ends 50 of the forked levers being connected by links 51 with the ends of another forked lever 52, pivotally mounted in the bracket 53, attached below one of the rails 36, and provided with an extending operating handle 54, by which it may be operated.

Due to the slots 45, the links 43 may be moved longitudinally on the apparatus, as may also the teat cups, the looped connection of the support rods 35 being slidably engaged with the rails 36, so as to suit the conditions.

In operation, the harness elements 40 having been applied to the animal, and the teats entered into the cups 31 when the constraining rings 42 are in an uppermost position, a partial vacuum is formed in the containers 12, creating a suction so that the milk, pressed from the teats by operating the handle 54, which through the system of levers causes the rings 42 to alternately raise and fall, compressing the teat cup, produces a flow of milk which enters the container by gravity further induced by the vacuum therein.

Having thus described my invention what I claim as new and desire to secure by Letters Patent, is—

1. A milking machine comprising a portable frame adapted to be secured in operative position, a plurality of pliable teat cups adjustably mounted in said frame, said teat cups having an elliptical longitudinal section, rigid rings encompassing said cups, and means for manually actuating said rings whereby said teat cups are compressed.

2. A milking machine, comprising a portable frame, means for securing said frame in position, teat cups adjustably engaged in said frame, said teat cups being of pliable material, manually operable levers mounted on said frame, rigid rings arranged circumjacent to the smaller portions of said teat cups, and adapted to compress the same as they are moved longitudinally thereon, means combined with said levers for operating said rigid rings, and flexible tubular connections from each of said teat cups leading to a container.

3. In a milking machine, the combination with a frame, means for supporting said frame, and a plurality of pliable teat cups adjustably mounted in said frame, of rings movable circumjacent of said cups and adapted to produce a compressive effect, therein manually operated means for actuating said rings, tubes extending from said cups, valves arranged in said tubes, a container, tubular connections extending from said container to said tubes and means for producing a partial vacuum in said container.

4. In a milking machine, the combination with a movable frame, means combined therewith for attaching said frame in operative position, said frame having a pair of rails in its upper portion, pliable teat cups adapted to receive the teats of an animal, connections from said cups to said rails whereby they may be moved longitudinally thereon, rings surrounding said cups, said rings being adapted to compress said cups as they are moved longitudinally over their surface, levers in said frames whereby said rings are moved alternately over the surface of said teat cups, a container, a gage in said container by which the contents may be visibly ascertained, flexible tubes extending from said container, a valve therein, and means for producing a partial vacuum in said container.

5. In a milking machine, the combination with a support frame, and means for engaging said frame with an animal, of a plurality of longitudinally disposed rails formed with said support frame, pliable teat cups adjustably arranged on said rails, said teat cups having an enlarged central portion, rigid rings disposed to encircle said cups, links extending from said rings, a lever engaged with said rings, means for actuating said lever, said lever being fulcrumed on said frame, a hollow container adapted to be sealed air tight, a gage by which the contents of said container may be visually ascertained, means for dispensing liquid from said container at the bottom thereof, handles by which said container may be operated, a flexible tube engaged at the upper portion of said container, a valve set in said tube, said tube having a plurality of branches engaged at the opposite end of said valve, said branch tubes engaging with the lower extremity of said teat cups, and independent valves set in each of said tubes whereby the passage therethrough may be individually controlled.

In testimony whereof I have affixed my signature.

DYON TEHUR.